UNITED STATES PATENT OFFICE.

ARTHUR ZITSCHER AND ERNST JULIUS RATH, OF OFFENBACH-ON-THE-MAIN, GERMANY, ASSIGNORS TO CORPORATION OF CHEMISCHE FABRIK GREISHEIM-ELEKTRON, OF FRANKFORT-ON-THE-MAIN, GERMANY.

PROCESS OF MAKING NITRO-AMINO DERIVATIVES OF THE ANTHRAQUINONE SERIES.

1,066,777.     Specification of Letters Patent.     Patented July 8, 1913.

No Drawing.     Application filed November 30, 1912. Serial No. 734,237.

*To all whom it may concern:*

Be it known that we, ARTHUR ZITSCHER and ERNST JULIUS RATH, both chemists, doctors of philosophy, and citizens of the German Empire, and residents of Offenbach-on-the-Main, in the Grand Duchy of Hesse, Germany, with post-office addresses Friedrichstrasse 31 and Kaiserstrasse 115, respectively, have invented new and useful Improvements in the Process of Making Nitro-Amino Derivatives of the Anthraquinone Series, of which the following is a specification.

According to this invention, the nitramins of the anthraquinone series can be converted in absence of nitratable substances such as phenol in the nitro-amino derivatives by mineral acids, except concentrated nitric acid. Thus the anthraquinone-α-nitramin, which is described in the German specification No. 156803, yields by treatment with concentrated sulfuric acid a mixture of 1-amino-2-nitro-anthraquinone and 1-amino-4-nitro-anthraquinone, whereas the anthraquinone-β-nitramin yields almost exclusively 1-nitro-2-amino-anthraquinone. Analogous products are obtained from 1:5-dinitramin and 2:6-dinitramin of anthraquinone or from the substitution products of the nitramins.

The anthraquinone-β-nitramins can be made by heating the corresponding isodiazo compounds with oxidizing agents, for example with sodium hypochlorite or potassium ferricyanid.

The simplest representative of the anthraquinone-β-nitramins has probably the formula:

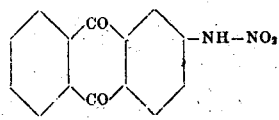

The nitro-amino-derivatives of anthraquinone can be easily transformed into the corresponding diamino-derivatives of anthraquinone by reduction, for example with sodium sulfid.

In carrying out the new process practically we can proceed as follows, the parts being by weight:

Example I: 10 parts of anthraquinone-α-nitramin described in the German specification No. 156803, are introduced into 100 parts of cold concentrated sulfuric acid and the mixture is stirred for an hour at ordinary temperature, and then the solution is poured onto ice. The mixture of 1:2- and 1:4-amino-nitro-anthraquinone thus obtained in the form of a red precipitate, is filtered off, washed with water, until it shows neutral reaction and dried. The same result is obtained by heating anthraquinone-α-nitramin with concentrated hydrochloric acid or phosphoric acid.

Example II: 10 parts of anthraquinone-β-nitramin obtained by treating the β-iso-diazotate of anthraquinone with sodium hypochlorite are introduced into 100 parts of concentrated sulfuric acid; after stirring for an hour the solution is poured onto ice and the product of conversion, which has separated in the form of a dark yellow precipitate, is filtered, washed with water, until it shows neutral reaction, and dried. The body, thus obtained, corresponds in its properties with 1-nitro-2-amino-anthraquinone described by Terres (see *Dissertation,* Braunschweig 1910, page 13). By treatment with reducing agents it is transformed into the well known 1:2-diamino-anthraquinone, which melts at 242-244° C.

Now what we claim and desire to secure by Letters Patent is the following:

The process of making nitro-amino derivatives of the anthraquinone series consisting in treating the nitramins of anthraquinone with non-nitrating mineral acids in absence of nitratable substances.

In testimony, that we claim the foregoing as our invention, we have signed our names in presence of two witnesses, this fourteenth day of November 1912.

ARTHUR ZITSCHER.
    ERNST JULIUS RATH.

Witnesses:
  PETER LAUTENSCHLÄGER,
  FRITZ DÉSOR.